United States Patent [19]

Geletka

[11] Patent Number: 5,135,280
[45] Date of Patent: Aug. 4, 1992

[54] VEHICULAR HATCHBACK CONVERSION APPARATUS

[76] Inventor: John R. Geletka, 2737 Hughes Ct., Warren, Mich. 48092

[21] Appl. No.: 731,456

[22] Filed: Jul. 17, 1991

Related U.S. Application Data

[63] Continuation-in-part of Ser. No. 514,560, Apr. 26, 1990, abandoned.

[51] Int. Cl.$^5$ ............................................. B60J 7/08
[52] U.S. Cl. ........................................ 296/107; 296/56; 296/76
[58] Field of Search ................... 296/107, 108, 56, 76, 296/146

[56] References Cited

U.S. PATENT DOCUMENTS

| | | | |
|---|---|---|---|
| 4,413,854 | 11/1983 | Hirshberg | 296/76 X |
| 4,566,728 | 1/1986 | Theodore | 296/76 |
| 4,695,089 | 9/1987 | Fukutomi et al. | 296/107 |
| 4,877,283 | 10/1989 | Little et al. | 296/76 X |

FOREIGN PATENT DOCUMENTS 3816060  11/1989  Fed. Rep. of Germany ...... 296/107

*Primary Examiner*—Johnny D. Cherry
*Assistant Examiner*—Gary C. Hoge
*Attorney, Agent, or Firm*—Reising, Ethington, Barnard, Perry & Milton

[57] ABSTRACT

A vehicular hatchback conversion apparatus (20) for attachment to the peripheral hatch opening (22) in a hatchback style vehicle (24) for converting a unitary hatchback having a fixed window embedded therein to a retractable rear window style hatchback includes a transparent window (62) fabricated from either flexible or rigid material and supported over a forward portion of the hatch opening (22). The window (62) folds downwardly, either rearwardly or forwardly, onto a shelf (72) or is collapsed in accordion style to uncover the forward portion of the hatch opening (22). A trunk lid (48) covers a rearward portion of the hatch opening (22) and pivots between closed and open positions to permit storage space (34) access through the hatch opening (22). The hatchback conversion apparatus (20) is a retrofit device which does not structurally alter or damage the hatch opening (22) and therefore permits reinstallation of the stock unitary hatchback on the vehicle (24).

26 Claims, 7 Drawing Sheets

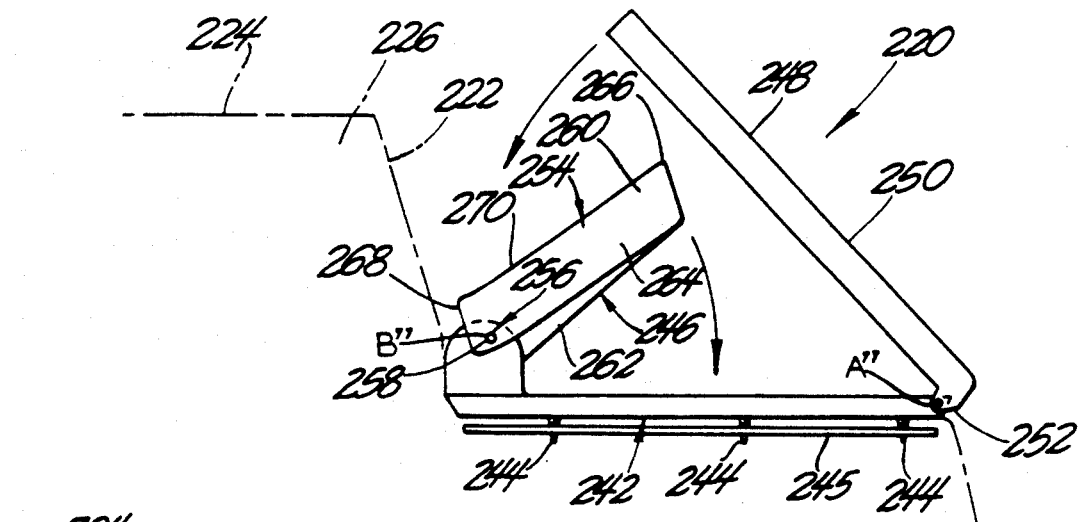

VEHICULAR HATCHBACK CONVERSION APPARATUS

This is a continuation-in-part of copending application(s) Ser. No. 07/514,560 filed on Apr. 26, 1990 now abandoned.

TECHNICAL FIELD

The subject invention relates to a vehicular hatchback conversion apparatus for attachment to the peripheral hatch opening in a hatchback type vehicle for converting a stock unitary hatchback having a fixed window embedded therein to a retractable rear window style hatchback including an integral pivotal truck lid.

BACKGROUND ART

Hatchback style vehicles typically include a peripheral hatch opening disposed about a rearward dorsal side thereof. A unitary hatchback member is pivotally attached to the vehicle and articulated between a closed position sealably engaging the peripheral hatch opening and an open position for permitting access to the vehicle storage space through the hatch opening.

Many hatchback style vehicles are styled so as to attract the sports car minded driving enthusiast. Such sports cars typically include T-type removable roof panels or Targa style removable roof panels in order to provide an open air, or convertible, feeling for the passengers in the vehicle. However, because such hatchback style sport vehicles are enclosed from the T-type or Targa-style roof panel opening rearward, i.e., in the hatchback area, the occupants of the vehicle are not impressed with an open air feeling. As a result, hatchback style sport vehicles having a unitary hatchback are not as enjoyable to drive and are not as attractive to new and used sport vehicle buyers when compared with similarly situated fully convertible sport vehicles.

SUMMARY OF THE INVENTION AND ADVANTAGES

The subject invention contemplates a vehicular hatchback conversion apparatus for attachment to the peripheral hatch opening in a hatchback style vehicle for converting a unitary hatchback having a fixed window embedded therein to a retractable rear window style hatchback. The subject apparatus comprises an attachment means for fixed attachment to at least a portion of the peripheral hatch opening of a hatchback style vehicle, a window means supported on the attachment means for sealably covering a forward portion of the hatch opening and providing a transparent port through the hatch opening, a trunk lid means pivotally supported on the attachment means for sealably covering a rearward portion of the hatch opening and pivoting relative to the attachment means to permit storage space access through the hatch opening. The subject invention is characterized by a retraction means operatively coupled to the window means for retracting the window means to a retracted position to uncover the forward portion of the hatch opening while the trunk lid means sealably covers the rearward portion of the hatch opening.

The improvement of the subject invention comprises the retraction means which permits the window means to be retracted such as by folding or collapsing to uncover the forward portion of the hatch opening while the trunk lid means remains in a closed position sealably covering the rearward portion of the hatch opening to provide the hatchback style vehicle with the ambiance of a fully open air (convertible) vehicle. Accordingly, the subject vehicular hatchback conversion apparatus converts a standard hatchback style vehicle to one having a convertible rear window which, in conjunction with other features such as T-tops or a Targa style removable roof panel, more closely approximates the actual open air feeling of a true convertible vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 10 is a side view of the second alternative embodiment of the vehicular hatchback conversion apparatus as in FIG. 9 showing the window means partially retracted and the trunk lid means pivoted upwardly from the hatch opening;

FIG. 11 is a side view of a third alternative embodiment of the subject invention shown disposed in an operative position;

FIG. 12 is a side view of the third alternative of the subject invention as in FIG. 11 with the window means partially retracted and the trunk lid means pivoted upwardly from the hatch opening to permit storage space access through the hatch opening;

DETAILED DESCRIPTION OF THE PREFERRED EMBODIMENT OF FIGS. 2-6

Figure 3:
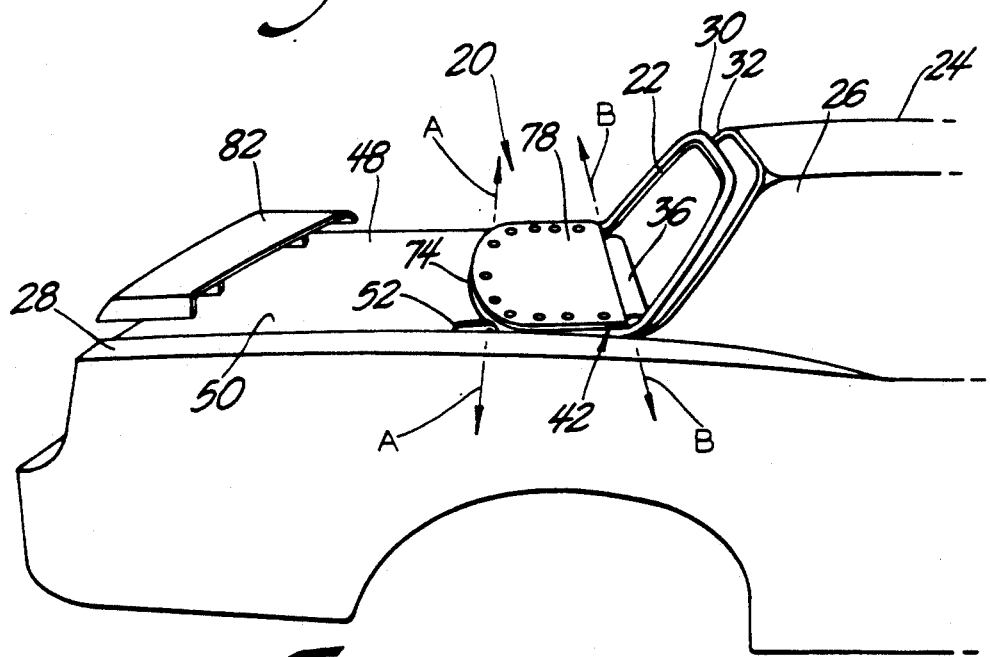
FIG. 3 is a perspective view of a hatchback style vehicle as in showing the vehicular hatchback conversion apparatus of the subject invention disposed for operation on the vehicle with the window means in a fully retracted position uncovering the forward portion of the hatch opening while the trunk lid means sealably covers the rearward portion of the hatch opening.
Figure 2:
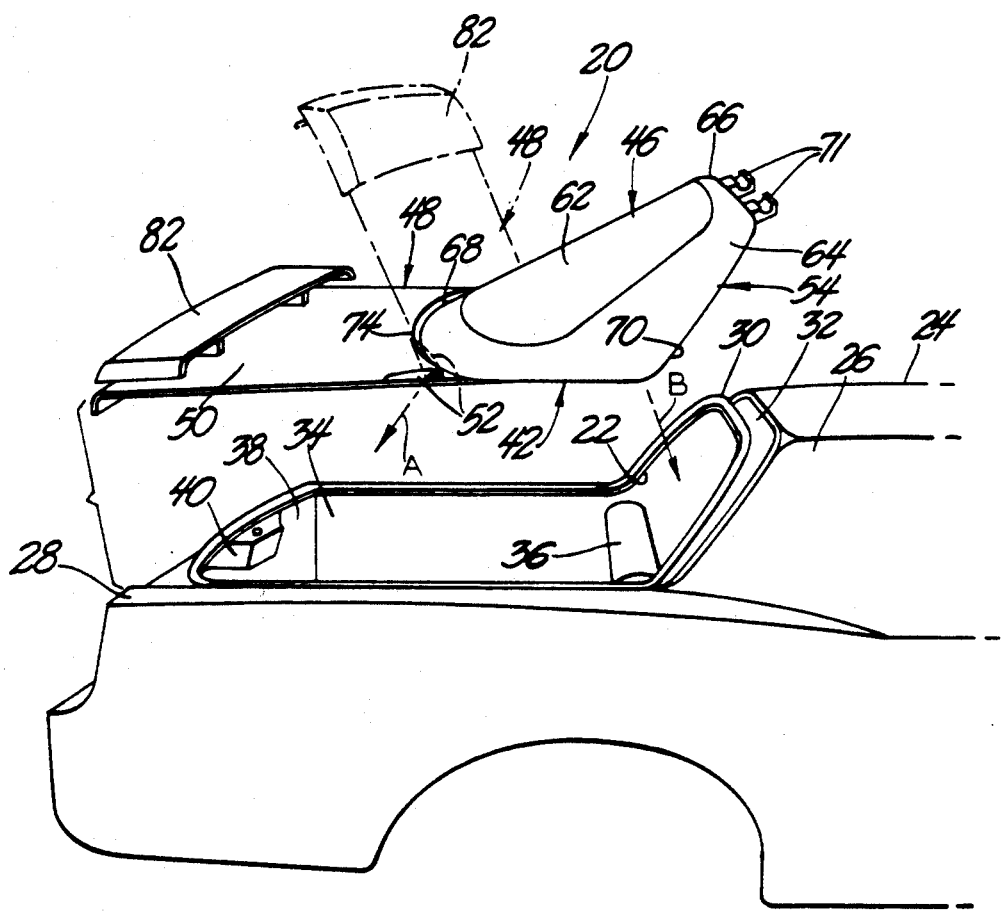
FIG. 2 is a perspective view of a hatchback style vehicle as in FIG. 1 including a vehicular hatchback conversion apparatus according to the subject invention shown in exploded fashion detached from the hatch opening of the vehicle.

Referring to FIGS. 2-6, wherein like numerals indicate like or corresponding parts throughout the several views, a vehicular hatchback conversion apparatus according to the subject invention is generally shown at 20 in FIG. 2. The subject hatchback conversion apparatus 20 is of the type for attachment to the peripheral hatch opening 22 in a hatchback style vehicle 24. More particularly, and as shown in FIGS. 2 and 3, a typical self-propelled hatchback style vehicle 24 is provided with the hatch opening 22 about a rearward dorsal side thereof. The vehicle 24 illustrated in FIGS. 2 and 3 includes a B-pillar section of the roof 26 having a rearward edge forming a somewhat vertical portion of the hatch opening 22. The vehicle 24 further includes a rear deck portion 28 having an enlarged opening therein forming a substantially horizontal portion of the hatch opening 22. The periphery of the hatch opening 22 is provided with a resilient rubber-type weather strip 30 for perfecting and maintaining a fluid resistant seal about the hatch opening 22. A recessed water channel 32 is provided about the exterior periphery of the weather strip 30 for capturing and channeling run-off water away from the hatch opening 22.

Within the interior of the vehicle 24, immediately below the hatch opening 22, is provided a storage space 34. The storage space 34 is bounded on the forward end by a passenger seat 36 and at the rearward end by a rear wall 38. A trunk lid lock assembly 40 extends forwardly from the rear wall 48.

Figure 1:
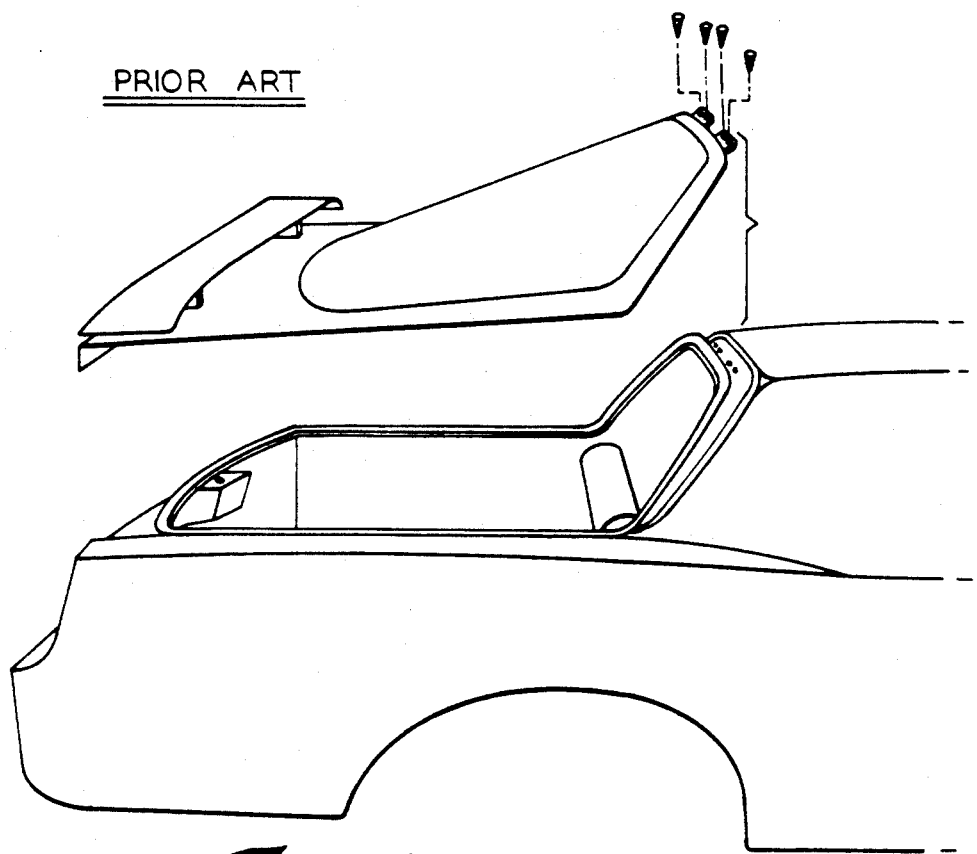
FIG. 1 is a perspective view of a hatchback style vehicle having the usual prior art unitary hatchback assembly shown in exploded fashion detached from the hatch opening of the vehicle.

FIG. 1 illustrates a typical prior art hatchback style vehicle having the usual unitary hatchback including a fixed window embedded therein. Such unitary hatchbacks are typically connected to the B-pillar of the vehicle roof by a pair of hinges secured by removable threaded fasteners or the like. Access to the storage space is gained by unlocking the trunk lid lock assembly and rotating the entire unitary hatchback upwardly, away from the hatch opening. Typically, a pair of spring-like gas struts are provided (not shown) for assisting with the opening of the hatchback and with sustaining the hatchback in an open position. The window is not retractable and hence the vehicle can not be converted to an open air style vehicle without completely removing the entire unitary hatch, which for practical reasons is not an acceptable option.

Referring again to FIGS. 2-6, the subject hatchback conversion apparatus 20 is provided for attachment to the peripheral hatch opening 22 for converting the prior art unitary hatchback having a fixed window embedded therein, as shown in FIG. 1, to a retractable rear window style hatchback as best shown in FIGS. 2 and 3.

Figure 6:
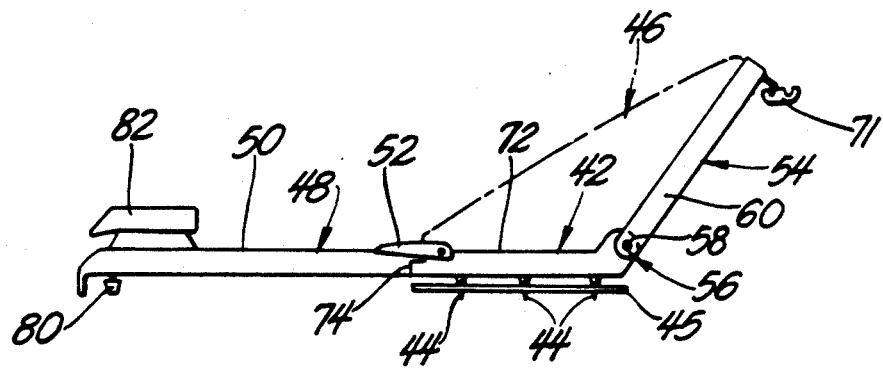
FIG. 6 is a side view as in FIG. 5 showing the trunk lid means pivotally attached to the attachment means.

The subject apparatus 20 includes an attachment means, generally indicated at 42, for fixed attachment to at least a portion of the peripheral hatch opening 22 of the hatchback style vehicle 24. As shown in the embodiment of FIGS. 2-6, and also confirmed in the four alternative embodiments to be described subsequently, the attachment means 42 comprises that portion of the apparatus 20 which is fixedly attached to the hatch opening 22. It is the attachment means 42 which permits the subject apparatus 20 to be directly retrofit onto a factory stock hatchback vehicle 24. In the present embodiment, FIGS. 5 and 6 illustrate a plurality of threaded fasteners 44, i.e., screws, which extend downwardly through each side of the attachment means 42 and threadably engage a clamp bar 45 to draw the clamp bar 45 upwardly upon rotation of the fasteners 44. In operation, one clamp bar 45 is disposed along each side of the peripheral opening 22 immediately below the weather strip 30 and the water channel 32, with an inner portion of the clamp bars 45 extending inwardly to receive the fasteners 44 spaced inwardly from the periphery of the hatch opening 22. Therefore, as the fasteners 44 are rotated, the clamp bar 45 is drawn upwardly to sandwich the peripheral hatch opening 22 between the clamp bars 45 and a lower support surface of the attachment means 42. Of course, other means used to secure the attachment means 42 to the vehicle 24 may be employed. For example, many stock hatchbacks are counterbalanced by a pair of gas struts which function much like springs to assist in opening the hatchback. Such gas struts are supported in corresponding support bosses (not shown) which, when the struts are removed, provide an excellent water-tight location to which the attachment means 42 may be anchored. Preferably, however, whatever means is chosen to secure the attachment means 42 to the vehicle 24, such should be removable so that the stock unitary hatchback having a fixed window embedded therein (FIG. 1) may be reinstalled on the vehicle 24 for use during the cold winter months due to its inherently superior insulative qualities.

The subject apparatus 20 further includes a window means, generally indicated at 46 in FIGS. 2 and 6, which is supported on the attachment means 42 for sealably covering a forward portion of the hatch opening 22 and providing a transparent port through the hatch opening 22. At least a portion of the window means 46 is fabricated from a see-through material to provide rearward visibility for the driver of the vehicle 24. In this embodiment, the window means 46 engages over part of the hatch opening 22 to perfect and maintain a weather resistant seal against the weather strip 30. The window means 46, together with the attachment means 42, provides a covering for the forward portion of the hatch opening 22 so as to isolate the interior of the vehicle 24 from exposure to the ambient surroundings.

The apparatus 20 further includes a trunk lid means 48 defining a generally planar trunk surface 50 pivotally supported on the attachment means 42 for sealably covering a rearward portion of the hatch opening 22 and pivoting relative to the attachment means 42 to permit storage space 34 access through the hatch opening 22. The trunk lid means 48 covers the remaining rearward portion of the hatch opening 22 and engages the weather strip 30 to perfect and maintain a weather resistant seal and together with the window means 46 and attachment means 42 complete such seal about the entire periphery of the hatch opening 22. The trunk lid means 48 is a unitary structure fabricated to match the color, contour, and texture of the vehicle 24. As perhaps best shown in FIGS. 4 and 6, the trunk lid means 48 includes a pair of hinge fingers 52 extending securely therefrom and rotatably attached to the attachment means 42 to establish a rotary trunk axis A disposed substantially parallel to the plane of the trunk surface 50.

A retraction means, generally indicated at 54, is operatively coupled to the window means 46 for retracting the window means 46 toward the plane of the trunk surface 50 to a retracted position to completely uncover the forward portion of the hatch opening 22 while the trunk lid means 48 sealably covers the rearward portion of the hatch opening 22. That is, as shown by comparison in FIGS. 2 and 3, the retraction means 54 permits the window means 46 to be folded, or collapsed, to a downwardly retracted position in typical convertible fashion to uncover the forward portion of the hatch opening 22 and thus impress the occupants of the vehicle 24 with the feeling of an open air type vehicle.

The retraction means 54 includes a pivotal displacement means, generally indicated at 56 in FIGS. 5 and 6, for downwardly pivoting the window means 46 in an arcuate path about a substantially horizontal window axis B. The window axis B and the trunk axis A are supported via the attachment means 42 substantially parallel to one another. More particularly, the pivotal displacement means 56 comprises a pair of coaxially aligned pivot pins 58 extending between and interconnecting the retraction means 54 and the attachment means 42.

Figure 4:
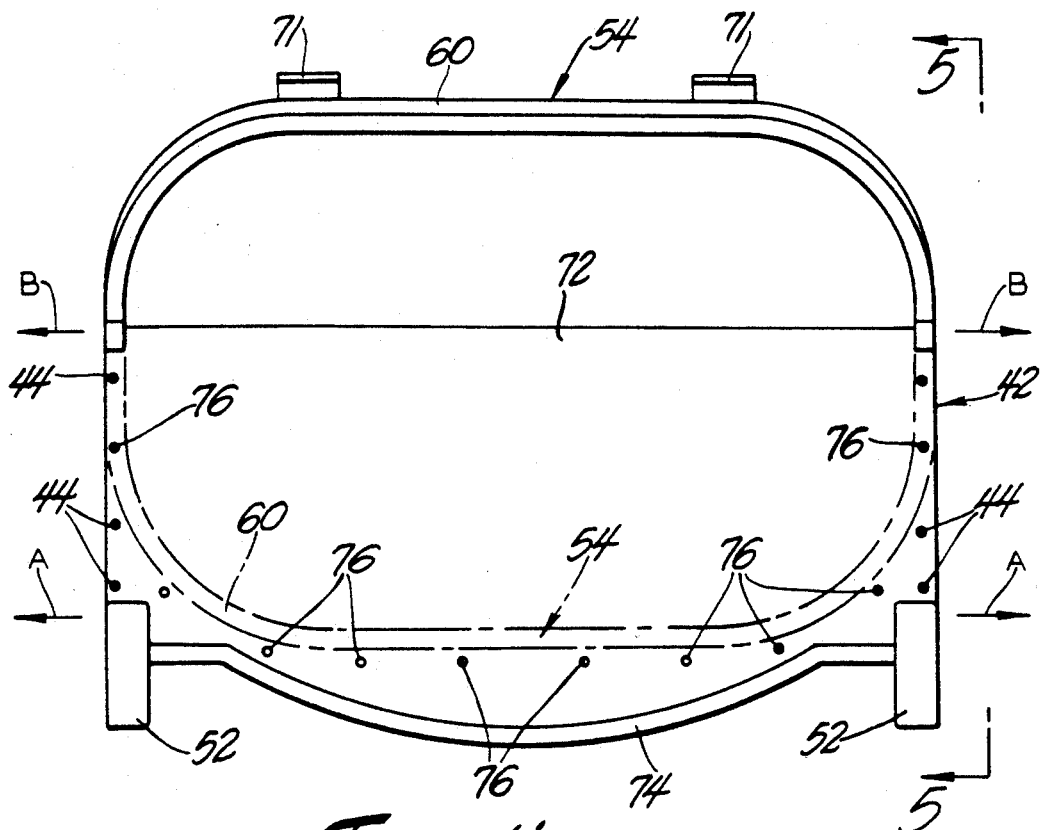
FIG. 4 is a top view of the attachment means, shelf and frame member.
Figure 5:
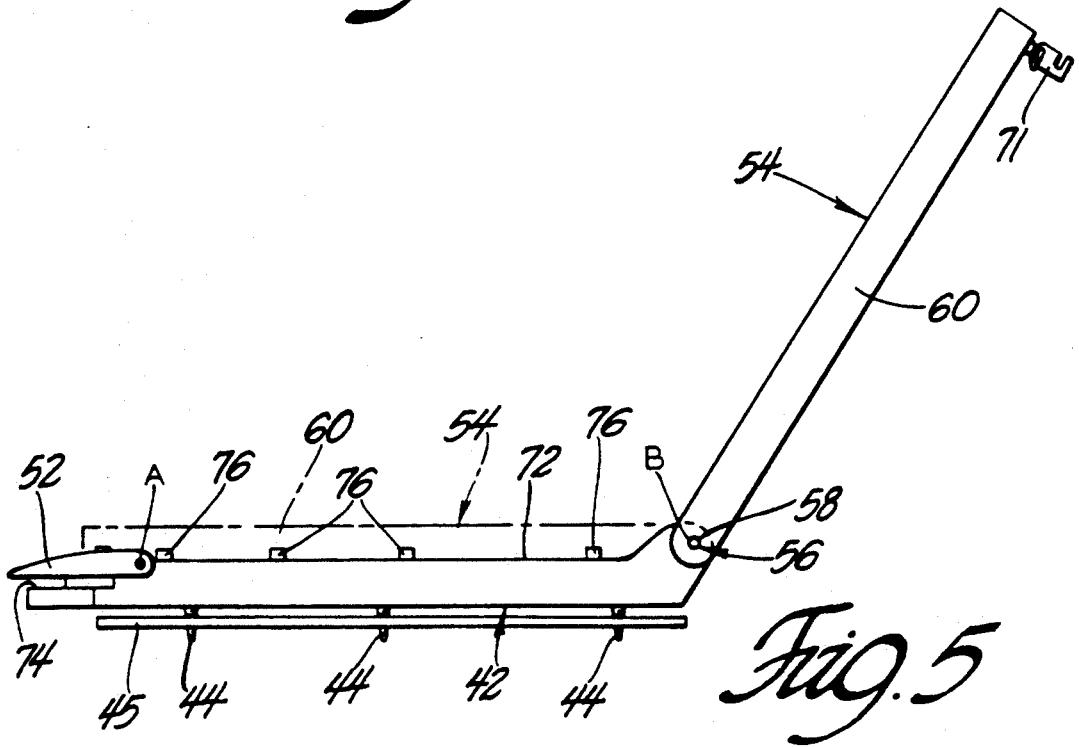
FIG. 5 is a side view as taken along lines 5—5 of FIG. 4.

In the embodiment of FIGS. 2-6, the retraction means 54 includes a rigid frame member 60 surrounding a portion of the periphery of the window means 46. As shown in FIG. 4, the frame member 60 has a bowed shape and is connected directly to the attachment means 42 via the pivot pins 58 of the pivotal displacement means 56. In FIGS. 4-6, the frame member 60 is shown in solid in the raised, or operative, position. In FIGS. 4 and 5, the frame member 60 is shown in phantom rotated by the pivotal displacement means 56 to the retracted position.

As well known in the art, the window means 46 includes a transparent plastic portion 62 and a surrounding opaque section 64. In the preferred embodiment of FIGS. 2-6, the opaque section 64 is fabric or pliable plastic. The transparent plastic portion 62 is fabricated from a pliable polymeric material foldable upon itself when the window means 46 is pivoted to the retracted position to uncover the forward portion of the hatch opening 22. An upper forward portion of the fabric section 64 is securely attached to the frame member 60 which functions to stretch the window means 46 taut in typical convertible roof fashion.

The periphery of the window means 46 includes an upper edge 66, a lower edge 68, and a pair of side edges 70 interconnecting the upper 66 and lower 68 edges. The frame member 60 surrounds and attaches to the upper edge 66 and a portion of each of the side edges 70 contiguous the upper edge 66 of the window means 46. The remaining portion of the periphery of the window means 46 comprising the lower edge 68 and the remaining portions of the side edges 70 contiguous the lower edge 68 are supported by and attached to the attachment means 42.

A latch means 71 is provided for releasibly securing the frame member 60 to the hatch opening 22, as best shown in FIG. 2. The latch means 71 is of the manual type for manually and selectively securing and releasing the frame member 60 to the hatch opening 22 so that the window means 46 may be moved between its extended and retracted operative positions. Preferably, the latch means 71 comprises an over-center style manual catch which engages a hook (not shown) disposed within the passenger compartment side of the B-pillar 26 in a manner known within the automotive industry. At least two such over-center manual catches are preferably provided for ensuring a durable and weather resistant seal along the hatch opening 22.

As perhaps best shown in FIG. 4, a shelf support 72 is supported on the attachment means 42 for receiving and supporting the window means 46 in its retracted position. The shelf 72 extends laterally across the hatch opening 22 to form a deck-like surface between the portions of the attachment means 42 secured to the water channel 32 of the hatch opening 22 by the fasteners 44. Preferably, the shelf 72 is fabricated from an opaque material and is formed integral with the attachment means 42. The forward edge of the shelf 72 is disposed over or just behind the top of the seat 36 so as to create a substantially enclosed trunk area about the storage space 34 which is accessed only through the trunk lid means 48.

The rearward edge of the shelf 72 extends between the hinge fingers 52 of the trunk lid means 48 and includes a symmetrically segmented contour comprising a central curved portion bounded on each end by two straight portions. A stepped rabbet 74 is formed along the rearward edge of the shelf 72 to create an interlocked weather resistant joint with the forward edge of the trunk lid means 48. Accordingly, the trunk lid means 48 includes a contoured forward surface complimenting the segmented contour of the rearward edge of the shelf 72. The rabbeted joint 74 between the shelf 72 and the trunk lid means 48 is shown in FIG. 6. A resilient weather stripping material may be disposed in the rabbet joint 74 between the shelf 72 and the trunk lid means 48 for enhancing the weather resistant seal therebetween.

As shown in FIG. 4, the shelf 72 includes a plurality of boot retainer means 76 for securing a protective boot 78 over the collapsed window means 46. The boot 78 is shown in FIG. 3. Preferably, the boot retainer means 76 comprises simple snaps or Velcro as is typical in convertible roof assemblies of the prior art.

The trunk lid means 48 includes a lock means 80 secured to the underside of the trunk lid means 48 for releasibly retaining the trunk lid means 48 fixed relative to the vehicle 24. More specifically, the lock means 80 is provided for engaging the trunk lid lock assembly 40 thus enabling the subject apparatus 20 to be operated as a conventional trunk enclosure thereby securing the storage space 34 against unauthorized access. On the upper or dorsal side of the trunk lid means 48, opposite the lock means 80, a spoiler 82 may be provided to compliment the particular aesthetic characteristics of the vehicle 24.

In operation, the subject apparatus 20 is provided as an aftermarket type retrofit device wherein the vehicle owner will remove or have removed the stock unitary hatchback having a fixed window embedded therein from the peripheral hatch opening 22 of the vehicle 24, as shown in FIG. 1. In its place, the subject apparatus 20 is installed to the peripheral hatch opening 22 for converting the vehicle 24 to a retractable rear window style hatchback vehicle. The primary advantage of the subject apparatus 20 is that the hatch opening 22 is not destroyed which would have the undesirable result of rendering the vehicle 24 incapable of readily receiving the reinstalled stock unitary hatchback having a fixed window embedded therein. Hence, the subject apparatus 20 can be used during warm weather months, with the stock unitary hatchback being quickly and easily reinstalled at the onset of cold weather.

The apparatus 20 is secured to the peripheral hatch opening 22 by fastening the attachment means 42 to the hatch opening 22 such as by the fasteners 44 and clamp bars 45 shown in FIG. 5. With this, the apparatus 20 is operatively positioned on the vehicle 24 with the pivotal trunk lid means 48 secured by the lock means 80 in the corresponding trunk lid lock assembly 40. The only remaining assembly step required is that hooks of some sort be provided within the interior roof section of the B-pillar 26 for engaging the latch means 71.

In order to retract the window means 46 to a downwardly retracted or collapsed position, the latch means 71 is manually released and the window means 46 is pivoted about the window axis B downwardly and rearwardly onto the shelf 72. The boot 78 is then disposed thereover as shown in FIG. 3. The vehicle 24 is now presented in condition as a substantially open air type vehicle. To return the window means 46 to its extended position covering the forward portion of the hatch opening 22, the boot 78 is removed and the frame member 60 is rotated upwardly, away from the shelf 72, to a position where the frame member 60 engages the weather strip 30 surrounding the forward portion of the hatch opening 22, and to a position where the latch means 71 may be manually operated to secure the window means 46 in this raised position.

FIRST ALTERNATIVE EMBODIMENT OF FIGS. 7 AND 8

Figure 7:
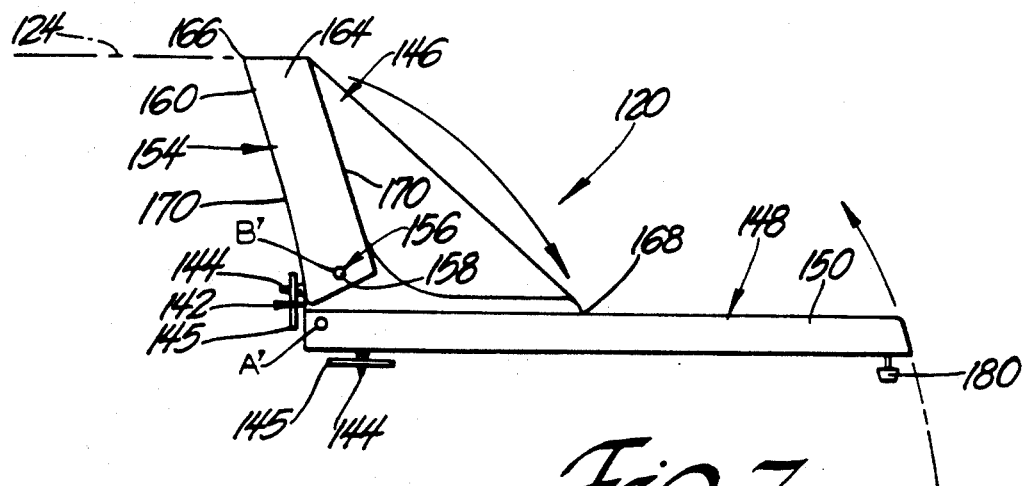
FIG. 7 is a simplified side view of an alternative embodiment of the subject vehicular hatchback conversion apparatus shown disposed in an operative position.
Figure 8:
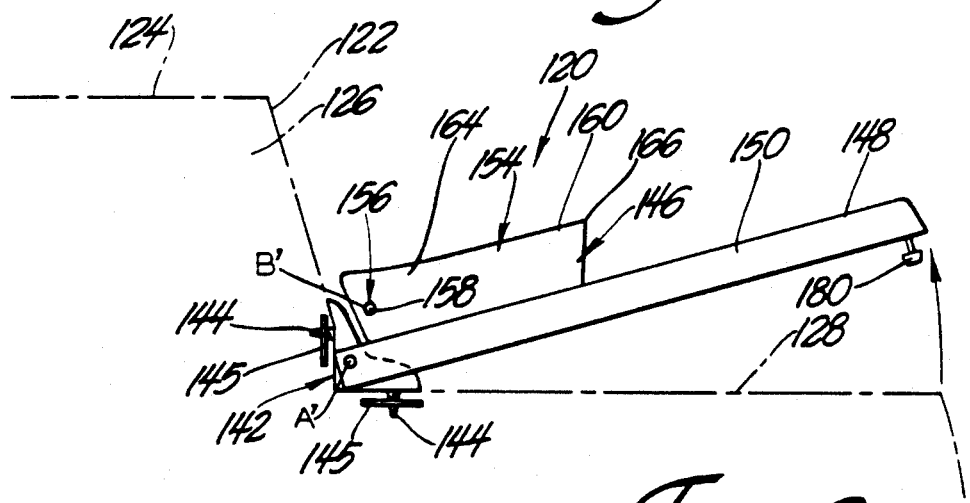
FIG. 8 is a side view of the alternative embodiment of the vehicular hatchback conversion apparatus as in FIG. 7 showing the window means retracted to a collapsed position to uncover the forward portion of the hatch opening with the trunk lid means partially pivoted upwardly from the hatch opening to permit storage space access through the hatch opening.

A first alternative embodiment of the subject apparatus is generally shown at 120 in FIGS. 7 and 8. Like or corresponding parts to those described above in connection with the preferred embodiment of the subject apparatus 20 are identified by like reference numbers preceded by the numeral 1. Hence, the first alternative embodiment of the subject apparatus is generally shown at 120 and includes an attachment means 142, a window means 146, and a trunk lid means 148. In this embodiment, the pivotal displacement means 156 is disposed between the frame member 160 and the trunk lid means 148. Hence, although the window means 146 is ultimately supported on the attachment means 142, the window means 146 is directly or contiguously supported on the trunk lid means 148. And, as with the preceding preferred embodiment, the frame member 160 and the transparent section 162 are nonremoveably attached to one another.

In FIG. 8, the attachment means 142 is shown as a pair of small L-shaped members secured in the corners between the B-pillar 126 and the rear deck 128 of the vehicle 124 by fasteners 144 coupled with corresponding clamp bars 145. Instead of being integral with the attachment means 142 as in the preferred embodiment described above, the shelf 172 is fully integral with the trunk lid means 148 so that the window means 146 folds or collapses in accordion or bellows style directly thereon. Accordingly, the periphery of the window means 46 comprising the lower edge 168 and portions of each of the side edges 170 contiguous the lower edge 168 are now supported by the trunk lid means 148.

The need for this first alternative embodiment of the subject invention 120, as well as the additional alternative embodiments described below, is prompted by numerous factors affected by the unique structural and styling characteristics of different makes and models of hatchback style vehicles. Among those factors which most affect the necessity of choosing one embodiment of the subject invention over the others include: 1) the particular aesthetics of the vehicle exterior, 2) the size or irregularity in shape of the water channel 32, 3) the size and storage space provided by the manufacturer of the vehicle for T-top roof panels or a Targa-style roof panel, 4) the presence or absence of a rear seat 36, 5) head clearance required by passengers, 6) configuration of the floor of the storage area 34, 7) location and configuration of wheel wells and shock towers in the storage area 34, 8) access to a spare tire, 9) access to and provision of the storage area 34, 10) configuration of the trunk lid lock assembly 40, 11) rear visibility, and 12) gas tank location. Hence, the need for variation in relocation, shape, and materials will be appreciated.

SECOND ALTERNATIVE EMBODIMENT OF FIGS. 9 AND 10

Figure 9:
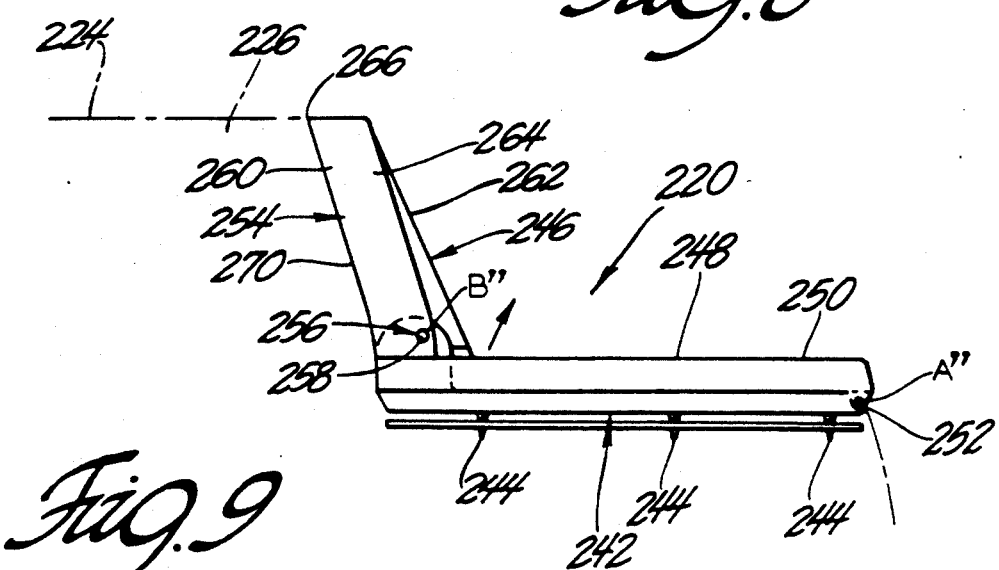
FIG. 9 is a side view of a second alternative embodiment of the vehicular hatchback conversion apparatus shown in an operative position.

A second alternative embodiment of the subject apparatus is generally shown at 220 in FIGS. 9 and 10. The second alternative embodiment of the apparatus 220 includes an attachment means 242, a trunk lid means 248 and a window means 246. The attachment means 242 comprises a pair of narrow strips or a single U-shaped strip securely fastened by threaded fasteners 244 and corresponding clamp bars 245 to the peripheral hatch opening 222 in the rearward portion of the rear deck 228.

In the second alternative embodiment, the hinge fingers 252 which pivotally attach the trunk lid means 248 to the attachment means 242 are disposed at the extreme rearward interface therebetween. In this manner, the trunk axis A'' is spaced sufficiently from the window means 246 to form a free swinging edge of the trunk lid means 248 disposed immediately adjacent the window means 246. Hence, the length of the attachment means 242 is substantially equal to the length of the trunk lid means 248 which thus requires the trunk lid means 248 to be rotated sufficiently upwardly above the window means 246 prior to retracting and collapsing the window means 246.

As shown in FIG. 10, once the trunk lid means 248 is rotated sufficiently upwardly, the window means 246 is rotated downwardly to the retracted position within the storage space 234 in the vehicle 224 with the trunk lid means 248 thereafter rotated back to a closed position covering and protecting the collapsed and retracted window means 246. In this embodiment, as with those preceding embodiments, the frame member 260 and the transparent section 262 are permanently secured together so that as the frame member 260 is rotated downwardly to the retracted position, the transparent section 262 follows.

THIRD ALTERNATIVE EMBODIMENT OF FIGS. 11 AND 12

A third alternative embodiment of the subject apparatus is generally shown at 320 in FIGS. 11 and 12. The third alternative embodiment of the subject apparatus 320 includes an attachment means 342, a window means 346, and a trunk lid means 348. In this embodiment, the frame member 360 is integral with the attachment means 342, with both being secured to the peripheral hatch opening 322 by threaded fasteners 344. The trunk axis A''' is formed with the hinge fingers 352 adjacent the corner of the hatch opening 322 between the B-pillar 326 and the rear deck 328.

Unique to this embodiment, nevertheless corresponding in concept to the preceding embodiments, the transparent section 362 of the window means 346 is shown as a rigid transparent member which is retractable downwardly and inwardly of the vehicle 324. A hinge, not shown, is attached to the bottom edge of the transparent section 362 to pivotally interconnect the transparent section 362 and the frame member 360. The side and upper edges of the transparent section 362 are secured to the opaque section 364 by some releasable means such as Velcro, zipper, latches, magnets, clamps, camlock type twist tabs or turnbuckles, or snaps. A latch member is shown for illustrative purposes in FIG. 12 as an L-shaped member secured to the free swinging upper edge of the transparent section 362. The opaque section 364 is integral with the frame member 360 in this embodiment. The shelf 372, also unique to this embodiment but equally applicable to the preceding embodiments, extends downwardly and forwardly from the frame member 362 for receiving and supporting the inwardly retracted transparent section 362 of the window means 346.

FOURTH ALTERNATIVE EMBODIMENT OF FIGS. 13 AND 14

Figure 13:
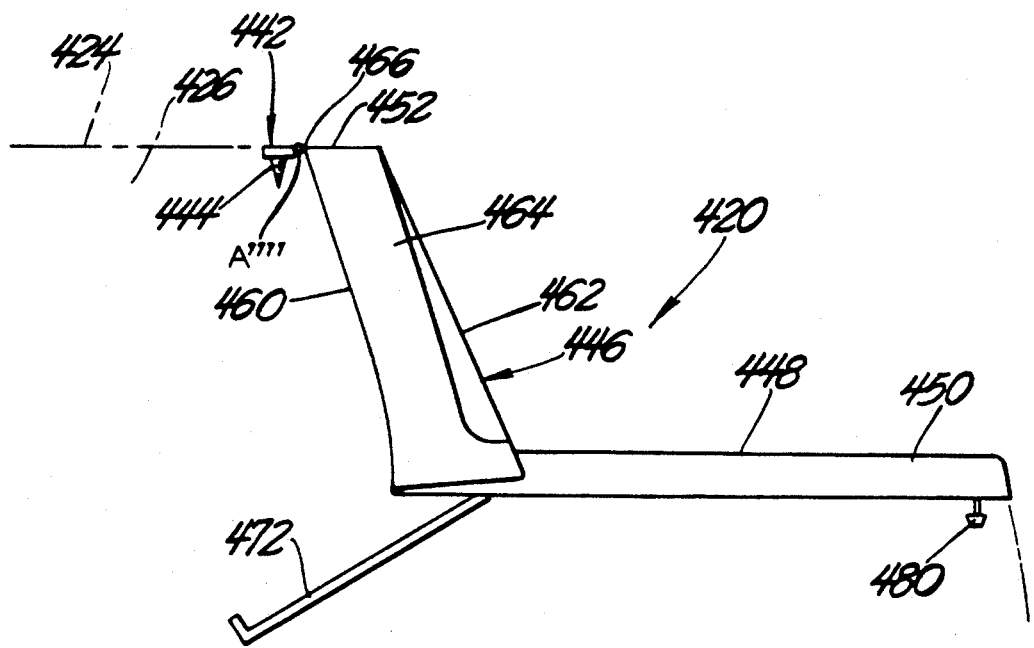
FIG. 13 is a fourth alternative embodiment of the subject vehicular hatchback conversion apparatus shown disposed in an operative position.
Figure 14:
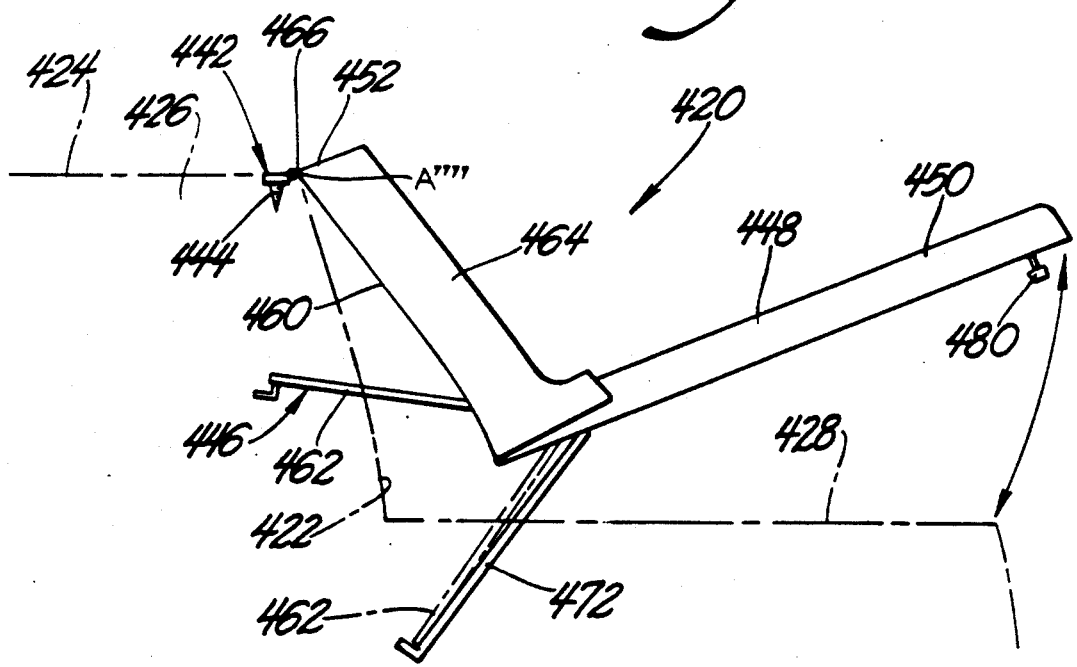
FIG. 14 is a side view of the fourth alternative embodiment of the vehicular hatchback conversion apparatus as in FIG. 13 showing the window means partially retracted and the trunk lid means rotated upwardly from the hatch openings to permit storage space access through the hatch opening.

A fourth alternative embodiment of the subject apparatus is generally shown at 420 in FIGS. 13 and 14. The fourth alternative embodiment of the subject apparatus 420 includes an attachment means 442, a window means 446, and a trunk lid means 448. In this embodiment, the attachment means 442 comprises a pair of hinges secured by threaded fasteners 444 to the upper extremity of the B-pillar 426 of the vehicle 424. The frame member 460 is formed integral with the trunk lid means 448 and includes an upper edge coincidental with the upper edge 466 of the window means 446. Both the frame member 460 and the trunk lid means 448 are pivotal about the trunk axis A'''' at the upper edge of the frame member 460. Hence, the fourth embodiment of the subject apparatus 420 more closely resembles a traditional unitary hatchback due to the placement of the trunk axis A''''.

In this fourth alternative embodiment of the subject apparatus 420, the transparent section 462 of the window means 446 is fabricated from a rigid sheet-like member and folded inwardly upon a downwardly and forwardly extending shelf 472 as in the third alternative embodiment above. However, as with all combinations of the previous embodiments, the window means 446 may comprise a flexible transparent section 462 folding downwardly and inwardly onto the shelf 472. Alternatively, the shelf 472 may be disposed rearwardly of the frame member 460 rather than forwardly therefrom as shown in FIGS. 13 and 14 with either a rigid or a flexible transparent section 462 of the window means 446 folding or collapsing rearwardly and downwardly thereon.

Figure 15:
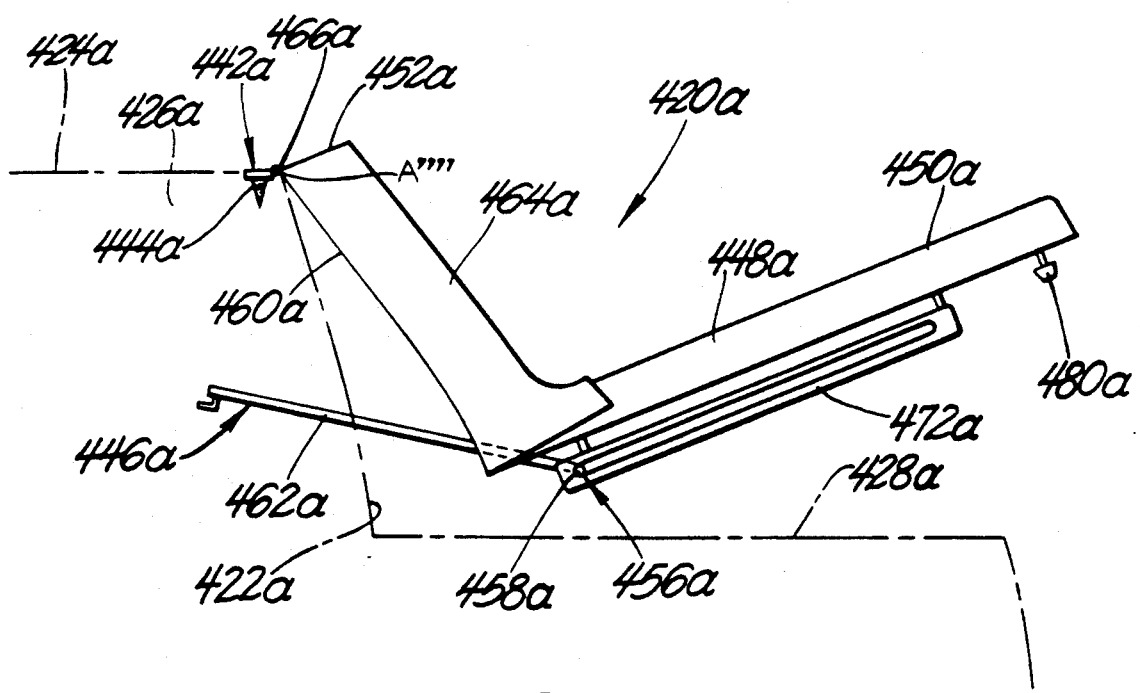
FIG. 15 is a side view as in FIG. 14 showing a modification in the shelf of the fourth alternative embodiment.

However, FIG. 15 illustrates yet another alternative method of retracting the transparent section 462a of the window means 446a. In this slightly modified form of the fourth alternative embodiment, the retraction means 454a cooperates with the shelf 472a and comprises a pair of linear tracks which slideably receive the pivot pins 458a of the pivotal displacement means 456a. The transparent section 462a is rigid and, when retracted to uncover the hatch opening 422a, pivots inwardly upon the pivot pins 458a. Then, the transparent section 462a is urged rearwardly so that the pivot pins 458a are guided in a horizontal sliding fashion within the slotted tracks of the shelf 472a. Structure is provided by the shelf 472a to retain the transparent section 462a supported securely to the underside of the trunk lid means 448a by the shelf 472a. It should be noted that this modified form of the shelf 472a may be adapted to the preceding embodiments of the subject invention.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A vehicular hatchback conversion apparatus (20) for attachment to the peripheral hatch opening (22) in a hatchback style vehicle (24) for converting a unitary hatchback having a fixed window embedded therein to a retractable rear window style hatchback, said apparatus (20) comprising:

attachment means (42) for fixed attachment to at least a portion of the peripheral hatch opening (22) of a hatchback style vehicle (24);

window means (46) supported on said attachment means (42) for sealably covering a forward portion of the hatch opening (22) and providing a transparent port through the hatch opening (22);

trunk lid means (48) pivotally supported on said attachment means (42) for sealably covering a rearward portion of the hatch opening (22) and pivoting relative to said attachment means (42) to permit storage space (34) access through the hatch opening (22);

and characterized by retraction means (54) operatively coupled to said window means (46) and movably supported on said attachment means (42) independently of said trunk lid means (48) for retracting said window means (46) to a retracted position to uncover the forward portion of the hatch opening (22) while said trunk lid means (48) sealably covers the rearward portion of the hatch opening (22).

2. An apparatus (20) as set forth in claim 1 further characterized by said retraction means (54) including pivotal displacement means (56) for pivoting said window means (46) in an arcuate path about a substantially horizontal window axis (B) to said retracted position.

3. An apparatus (20) as set forth in claim 2 wherein said trunk lid means (48) rotates relative to said attachment means (42) about a trunk axis (A), further characterized by said window axis (B) and said trunk axis (A) being substantially parallel to one another.

4. An apparatus (20) as set forth in claim 3 wherein said window means (46) includes a periphery, further characterized by a rigid frame member (60) surrounding at least a portion of said periphery of said window means (46).

5. An apparatus (20) as set forth in claim 4 further characterized by a support shelf (72) supported on said attachment means (42) for receiving and supporting said window means (46) in said retracted position.

6. An apparatus (20) as set forth in claim 5 further characterized by including lock means (80) secured to said trunk lid means (48) for releasibly retaining said trunk lid means (48) to the hatch opening (22).

7. An apparatus (320) as set forth in claim 6 further characterized by said frame member (360) and said attachment means (342) being integral.

8. An apparatus (320) as set forth in claim 7 further characterized by said shelf (372) extending downwardly and forwardly from said frame member (360).

9. An apparatus (320) as set forth in claim 7 further characterized by said window means (346) comprising a rigid sheet-like transparent section (362).

10. An apparatus (20) as set forth in claim 4 further characterized by said pivotal displacement means (56) being disposed between said frame member (60) and said attachment means (42).

11. An apparatus (20) as set forth in claim 10 further characterized by said pivotal displacement means (56) comprising a pair of coaxially aligned pivot pins (58).

12. An apparatus (20) as set forth in claim 4 further characterized by latch means (71) for releasibly securing said frame member (60) to the hatch opening (22).

13. An apparatus (20) as set forth in claim 12 further characterized by said latch means (71) comprising an over-center manual catch.

14. An apparatus (20) as set forth in claim 4 wherein said periphery of said window means includes an upper edge (66), a lower edge (68), and a pair of side edges (70) interconnecting said upper edge (66) and said lower edge (68), further characterized by said frame member (60) surrounding said upper edge (66) and a portion of said side edges (70) contiguous of said upper edge (66).

15. An apparatus (20) as set forth in claim 14 further characterized by a remaining portion of said periphery of said window means (46) comprising said lower edge (68) and portions of each of said side edges (70) contiguous said lower edge (66) being supported by said attachment means (42).

16. An apparatus (220) as set forth in claim 4 further characterized by said trunk axis (A″) being spaced from said window means (246) to form a free swinging edge of said trunk lid means (248) adjacent said window means (246).

17. An apparatus (220) as set forth in claim 16 wherein said attachment means (242) has a length and said trunk lid means (248) has a length, further characterized by said trunk lid length being substantially equal to said attachment means length.

18. An apparatus (20) as set forth in claim 5 further characterized by said shelf (72) being integral with said attachment means (42).

19. An apparatus (20) as set forth in claim 18 further characterized by said shelf (72) including boot retainer means (76) for securing a protective boot (78) over said window means (46) when in said retracted position.

20. An apparatus (20) as set forth in claim 1 further characterized by said window means (46) comprising a pliable polymeric material foldable upon itself when retracted to uncover the forward portion of the hatch opening (22).

21. A hatchback style vehicle (24) having a retractable rear window, said vehicle (24) comprising:
a self-propelled land vehicle (24) having a peripheral hatch opening (22) disposed about a rearward dorsal side thereof;
attachment means (42) for fixed attachment to at least a portion of said hatch opening (22);
window means (46) supported on said attachment means (42) for sealably covering a forward portion of said hatch opening (22) and providing a transparent port through said hatch opening (22);
trunk lid means (48) pivotally supported on said attachment means (42) for sealably covering a rearward portion of said hatch opening (22) and pivoting relative to said attachment means (42) to permit storage space (34) access through said hatch opening (22);
and characterized by retraction means (54) operatively coupled to said window means (46) and movably supported on said attachment means (42) independently of said trunk lid means (48) for retracting said window means (46) to uncover said forward portion of said hatch opening (22) while said trunk lid means (48) sealably covers said rearward portion of said hatch opening (22).

22. An apparatus (20) as set forth in claim 21 further characterized by said retraction means (54) including pivotal displacement means (56) for pivoting said window means (46) in an arcuate path about substantially horizontal window axis (B).

23. An apparatus (20) as set forth in claim 22 wherein said trunk lid means (48) rotates relative to said attachment means (42) about a trunk axis (A), further characterized by said window axis (B) and said trunk axis (A) being substantially parallel to one anther.

24. An apparatus (20) as set forth in claim 23 wherein said window means (46) includes a periphery, further characterized by including a rigid frame member (60) surrounding at least a portion of said periphery of said window means (46).

25. An apparatus (20) as set forth in claim 24 further characterized by including a support shelf (72) supported on said attachment means (42) for receiving and supporting said window means (46) in said retracted position.

26. An apparatus (20) as set forth in claim 25 further characterized by including lock means (80) secured to said trunk lid means (48) for releasibly retaining said trunk lid means (48) fixed relative to said vehicle (24).

* * * * *